March 21, 1933.  C. B. SAWYER  1,902,427

FLOW METER

Filed Jan. 10, 1930   2 Sheets-Sheet 1

INVENTOR
CHARLES B. SAWYER
BY Evans & McCoy
ATTORNEYS

March 21, 1933.      C. B. SAWYER      1,902,427
FLOW METER
Filed Jan. 10, 1930      2 Sheets-Sheet 2

INVENTOR
CHARLES B. SAWYER
BY Evans + McCoy
ATTORNEYS

Patented Mar. 21, 1933

1,902,427

UNITED STATES PATENT OFFICE

CHARLES B. SAWYER, OF CLEVELAND HEIGHTS, OHIO, ASSIGNOR TO THE BRUSH LABORATORIES COMPANY, OF CLEVELAND, OHIO, A CORPORATION OF OHIO

FLOW METER

Application filed January 10, 1930. Serial No. 419,826.

This invention relates to meters and particularly to meters used in determining characteristics of fluids, such as, for example, rate of flow.

In practice it frequently becomes desirable to determine a certain property or characteristic of a fluid such as vapor or gas. As a specific illustration, it may be desirable to measure the quantity of steam flowing through a conduit, in which case the characteristic to be determined is the rate of flow of the steam. The quantity of steam can be calculated from the rate of flow and the size of the conduit. It is desirable to determine such characteristics with a measuring apparatus or flow-meter which is simple and rugged in construction, and which may be economically and quickly operated to readily determine a desired characteristic of the flowing fluid. It is also desirable to employ a meter which will not require frequent calibration.

One of the objects of the present invention is to provide an improved means for determining characteristics of fluids.

Another object is to provide a flow-meter for fluids which may be easily maintained in operative and indicating condition to provide accurate and dependable data for determining characteristics of a fluid.

Still another object is to provide a flow-meter of comparatively few parts and, in general, of simple and rugged construction.

A further object is to provide a flow-meter for the determination of characteristics of fluids in which a constant rate of heat energy is supplied to a thermally sensitive body, exposed to a flowing fluid, whereby fluid characteristics may be determined by obtaining an average temperature of the thermally sensitive body.

Another object is to provide a flow-meter for the determination of the characteristics of flowing fluids by obtaining an average temperature of a thermo-sensitive body exposed to the flowing fluid.

With the foregoing and other objects in view which will be apparent from the detailed description to follow, this invention consists in certain novel features of construction and combinations of parts which will be readily understood by those skilled in the art.

The present invention proposes a very satisfactory means for determining a property or characteristic of a flowing fluid, and consists, in general, in inserting into the conduit through which the fluid is flowing, a heated body which is thermally sensitive, that is, a body which is responsive to variations in those characteristics of the surrounding fluid which affect the rate of heat exchange between the fluid and the body. The thermally sensitive body which may be in the form of a tube extending across the conduit, is preferably heated to a temperature above that of the flowing fluid, the heat being supplied at a constant rate. A thermometric resistance coil preferably extends the entire length of the thermally sensitive body so that the temperature obtained therefrom will be the average temperature of the body. In this apparatus, there will be an exchange or transfer of heat between the thermally sensitive heated body and the fluid to which the body is subjected, the rate of heat exchange being a function of the flow of the fluid. This average temperature of the thermally sensitive body will be an indication of, and will vary, such as, for example, the difference of the rate of flow, percentage of moisture, chemical composition, etc.

In the drawings which illustrate suitable embodiments of the present invention,

Figure 1:
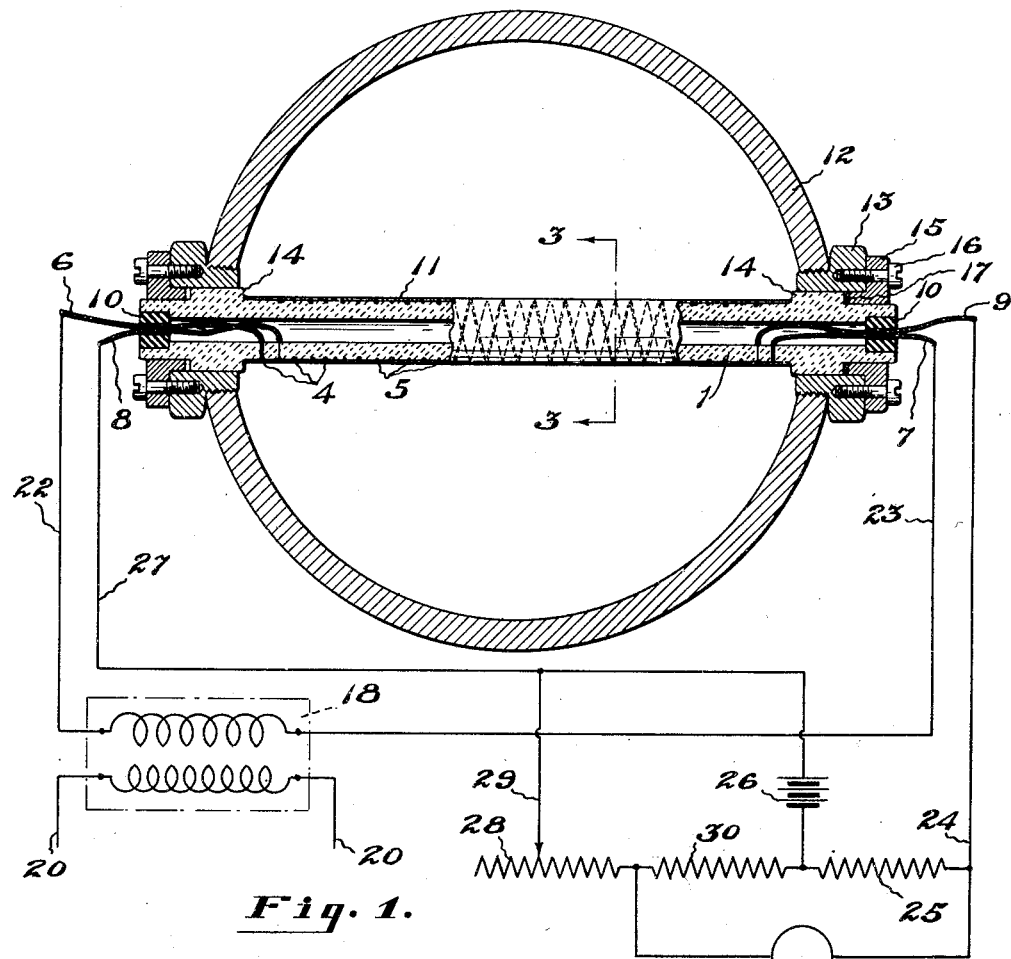
Figure 1 is a partial longitudinal section of one type of flow-meter, showing the same installed in a conduit, the external electrical system being shown diagrammatically.
Figure 2:
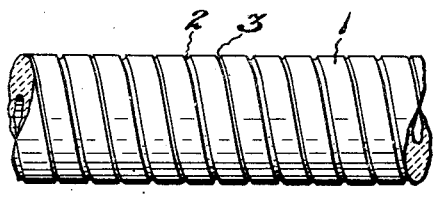
Fig. 2 is an enlarged fragmentary side elevation of the core of the thermally sensitive body showing the grooves therein for receiving the heater and thermometric resistance coils.
Figure 3:
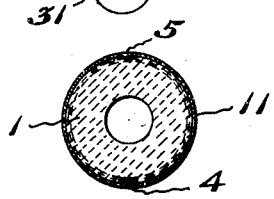
Fig. 3 is an enlarged transverse section taken on the line 3—3 of Fig. 1.

Referring to the accompanying drawings in which like numerals refer to like parts throughout the several views, the flow-meter illustrated in Figs. 1, 2 and 3 comprises a hollow refractory tube 1 of porcelain or some other suitable material, formed with a pair of spaced spiral grooves 2 and 3 extending substantially the entire length thereof. A heater wire 4 preferably having a negligible temperature coefficient of resistance, such as constantan, is wound around the tube 1 within the groove 2, and similarly a thermometric resistance wire 5 of nickel, platinum, or any other material suitable for resistance thermometry is wound around the tube 1 within the groove 3. Both ends of the heater and thermometric resistance wires 4 and 5 respectively, extend into the tube 1 at the ends of the same as shown in Fig. 1, the heater wire 4 being provided with insulated lead wires 6 and 7 extending through the ends of the tube, and the thermometric resistance wire 5 being provided with insulated lead wires 8 and 9 likewise extending through the ends of the tube 1. Grommets 10 surrounding the lead wires 6 and 8 at one end, and the lead wires 7 and 9 at the other end of the tube 1 are seated in the open ends of the tube to close the central opening thereof at its ends and substantially prevent the flow of heat from the interior of the same. The tube 1 having the heater and thermometric resistance windings 4 and 5 thereon may be coated with a vitreous enamel 11, so that the windings are embedded therein as shown in Figs. 1 and 3. The refractory tube 1 and its windings 4 and 5 built up in this manner, comprise the thermally sensitive body which is positioned in the conduit 12 through which the fluid flows whose characteristics are to be determined.

As illustrated in Fig. 1, the conduit 12 is provided with diametrically opposite annular plugs 13 threaded thereinto which receive the enlarged end portions 14 of the refractory tube 1 with a comparatively close fit. The extreme ends of the tube 1 are preferably reduced in diameter, and annular clamping plate 15 having a close fit therewith are secured to the plugs 13 with suitable screws 16 to secure the tube 1 in place in the conduit 12, packing rings 17 being interposed between the plates 15 and the enlarged portions 14 of the tube 1 to provide a gas tight joint to prevent the escape of the fluid from the conduit 12. The thermally sensitive body just described extends entirely across the passageway of the conduit so that it will be affected by flow of fluid, with the result that an average characteristic can be determined.

The electrical circuit for the flow-meter just described is diagrammatically shown in Fig. 1, and comprises a constant current transformer 18, the primary coil of which is connected through conductor wires 20 to a source of alternating current. The secondary coil of the transformer is connected through conductor wires 22 and 23 to the lead wires 6 and 7 respectively of the heater winding 4 in order that the heater winding 4 will be heated.

The lead wire 9 of the thermometer winding 5 is connected through a conductor wire 24 to one end of a thermometric resistance coil 25, the other end of the coil 25 being connected with one pole of a battery 26. The lead wire 8 of the thermometric resistance winding is connected through a conductor wire 27 to the other pole of the battery 26 and also to a variable resistance 28 through the conductor 29. The resistance 28 is connected to a resistance 30, which in turn is connected to the thermometric resistance 25. A galvanometer 31 is connected to the conductor 24 and to the connecting wire between the resistance 30 and variable resistance 28. The battery 26, resistances 25, 28 and 30, and the galvanometer 31, comprise the parts of a Wheatstone's bridge.

In operation, current from the supply circuit 20 enters the primary windings of the constant current transformer 18, from the secondary windings of which electric energy at constant current is supplied to the heater winding 4, and the winding 4 is raised to a temperature somewhat above the temperature of the fluid flowing through the conduits 22 and 23. Since the heater winding 7 is of constant temperature resistance, the heat energy dissipated by the winding 4 will be constant in amount. The heat is dissipated in whole or in part through the thermally sensitive body into the flowing fluid. The exchange or rather the transfer of heat to the fluid is a function of and consequently is dependent on the characteristic of the fluid which is to be metered. By reason of the fact that the thermally sensitive body extends entirely across the conduit 12, the average temperature of the heat exchange over the surface of the enamel coating 11 will be given by the thermometer winding 5, which average temperature can be determined from the readings of the Wheatstone's bridge comprising the resistance coils 25, 28 and 30, the battery 26 and galvanometer 31. From the readings of the Wheatstone's bridge, the average temperature given by the winding 5 across the thermally sensitive body can be readily ascertained, as will be readily understood by those skilled in the art. It can be seen that by heating the winding 4 to a temperature above the temperature of the fluid flowing through the conduit 12, the thermally sensitive body, because it extends substantially across the widest portion of the conduit 12, will be affected by the fluid with the result that the effects of the fluid on the thermally sensitive body will be averaged over the surface thereof, and that this average temperature will be given by the thermometric resistance winding 5. This is a valuable feature where the fluid varies in characteristics from one point to another, such as may occur when the fluid flows at a different rate through different portions of the conduit. It is evident that a meter of the nature just described is sensitive to small or rapid changes in flow and that the same is very adaptable for use in conduits of varying cross section, and also for slow flowing fluids which have a tendency to be retarded by the walls of the conduit.

The rate of flow of the fluid can be easily determined from the size of the conduit and the average temperature of the thermally sensitive body.

Figure 4:
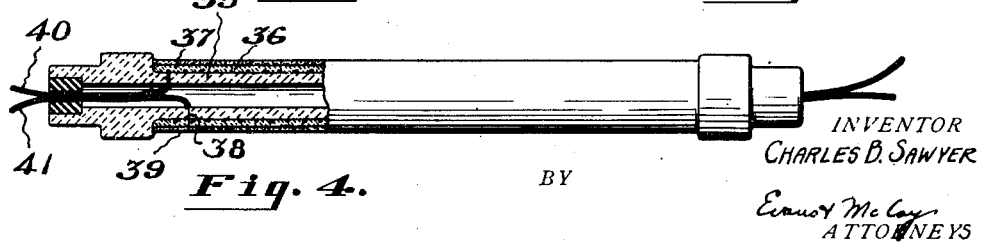
Fig. 4 is a longitudinal elevation of a modified type of meter, a portion of the same being broken away to show the relative positions of the heater and thermometric resistance coils.

The modified form of thermally sensitive body shown in Fig. 4 comprises a refractory tube 35 similar to the tube 1 previously described, around which the heater coil 36 is wound and embedded in a coating 37 of vitreous enamel or similar substance. This coating 37 protects the heater coil 36. The thermometric resistance coil 38 is wound around the insulating coating 37 and likewise is embedded in a suitable coating 39 of vitreous enamel. The coils 36 and 38 lead to the interior of the tube and are provided with suitable lead wires 40 and 41. Further than this, the construction of the thermally sensitive body just described, is identical to that shown in Fig. 1.

Figure 6:
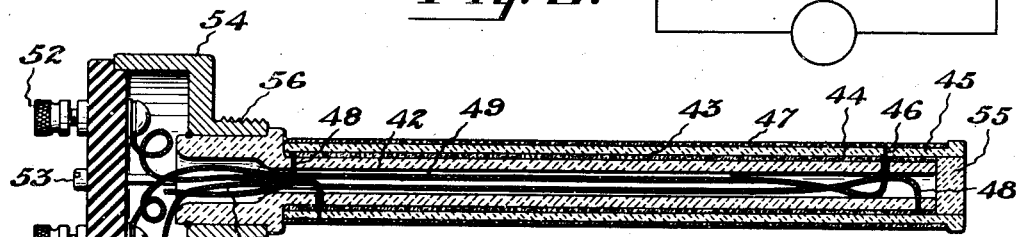
Fig. 6 is a longitudinal section of a modified form of meter taken on the line 6—6 of Fig. 7, which is adapted to be inserted through a single opening in a conduit.
Figure 7:
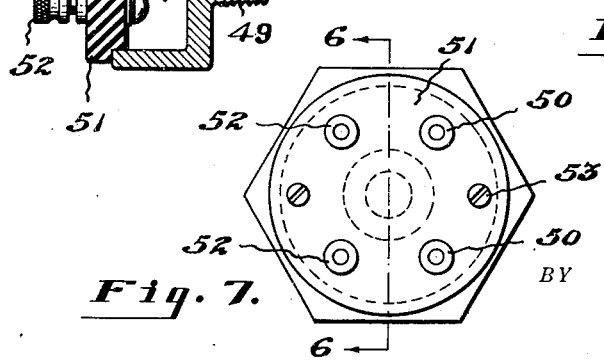
Fig. 7 is an end view of the meter shown in Fig. 6.

The modified form of thermally sensitive body shown in Fig. 6 is particularly adapted to be inserted in a conduit through a single opening or port. This modification is very rugged in construction and comprises a refractory core or tube 42 around which the heater coil 43 is spirally wound. The heater coil 43 similar to the previously described constructions is embedded in a coating 44 of insulating material. A refractory tube 45 of larger diameter is telescoped with the tube 42 and the thermometric resistance coil 46 is wound around the same and embedded in a suitable coating 47 of vitreous enamel. The coils 43 and 46 extend to the interior of the inner refractory tube 42 and are provided with suitable lead wires 48 and 49 respectively. The lead wires 48 of the heater coil 43 lead out through one end of the tube 42 and are connected to terminals 50 carried by an insulating block 51. Similarly the lead wires 49 of the thermometer coil 46 lead out through the same end of the tube 42 and are attached to terminals 52 carried by the insulating block 51. The insulating block 51 is secured by screws 53 to a housing 54 carried by the end of the inner refractory tube 42. The other end of the refractory tube is closed in with a refractory block 55 which prevents fluid from entering the tube 42 and disintegrating the lead wires 48 and 49. This thermally sensitive body is particularly adapted to be inserted into a conduit through a single opening therein, the housing 54 being provided with threads 56 so that it can be threaded into the opening in the conduit. The operation of the flow-meter just described, however, is identical to that described in connection with Fig. 1.

Figure 5:
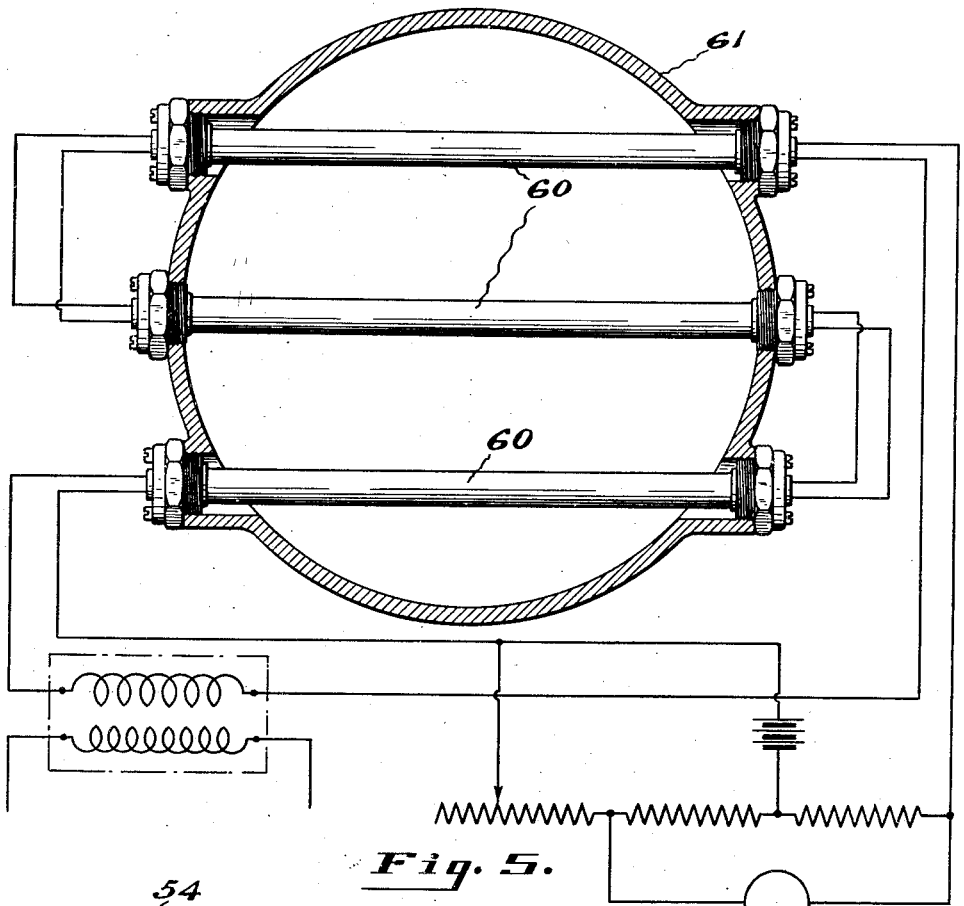
Fig. 5 is a view showing a plurality of flow-meters arranged in series over a cross-section of a conduit.

In some instances it is desirable to more accurately determine the characteristics of a flowing fluid. Fig. 5 illustrates a satisfactory arrangement of thermally sensitive bodies for accomplishing this. A plurality of thermally sensitive bodies 60 of any of the types previously described, are inserted into a conduit 61 in parallel arrangement, one being spaced above the other. The heater and thermometric resistance coils of these bodies 60 are connected in series as shown in the electrical diagram, the electrical parts of which are identical to those shown in Fig. 1 and need not, therefore, be described. These thermally sensitive bodies 60 function as a single flow-meter. It is plainly evident that very accurate results can be obtained with an arrangement of this sort, even when the fluid flows at a different rate through different portions of the containing conduit. Consequently, average characteristics can be very accurately determined.

It is evident to those skilled in the art that the embodiments shown and described are simple and rugged in construction, and will give reliable results.

It will be understood that this invention may be employed not only to measure quantities or rates of flow of fluid, such as of gases and liquids, but may also be used to determine other fluid characteristics such as chemical composition, percentage of moisture, etc., in which case the fluid may be either moving at a constant rate or stationary, the fluid characteristic being determined by the change of temperature of the thermally sensitive body when the body is immersed in the fluid.

It will be seen that in this invention, it is possible to supply heat to a thermally sensitive body not only at a constant rate but also at a reproducible rate so that results obtained at one time may be readily compared and correlated with results obtained at any other time. The simplicity and ruggedness and method of obtaining reliable results reduce to a considerable extent, the necessity for frequent calibration of the apparatus.

It will also be noted that simple and reliable means for determining the characteristics of fluids is provided by the present invention which may be readily constructed and maintained in operating condition without difficulty.

It will be seen that the indications of this meter will depend on the ambient temperature of the fluid, and, therefore, if it be desired to measure the characteristic of a fluid having one temperature at one time and having another temperature at another time, suitable calibration of the meter can be made to compare the results at these different temperatures. Any calibration utilized should, of course, correspond to the ambient temperature, or, if it is desired, this may be taken care of by a suitable automatic compensating device for changes in the ambient temperature, such as, for example, a well known secondary resistance thermometer analogous to the cold junction thermometer shown in my Patent No. 1,766,148, granted June 24, 1930.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a meter for determining a characteristic of a fluid, a thermally sensitive body arranged in heat interchanging relation with a fluid, said body including a heater winding having a negligible temperature coefficient of resistance arranged beneath the surface thereof, means for supplying constant energy to said heater winding to effect the interchange of heat between said fluid and said body including a constant current transformer and a source of constant alternating current supply, and a resistance thermometer arranged to determine the average temperature of the surface of said body in contact with said fluid.

2. In a meter for determining a characteristic of a fluid, a refractory member adapted to extend into the conduit containing said fluid, a heater winding having a negligible temperature coefficient of resistance supported by said refractory member, a temperature winding supported by said refractory member in spaced relationship to said heater winding, an enamel covering for said refractory tube embedding said heater and temperature windings, means for supplying constant energy to said heater winding for heating said enamel, whereby heat is interchanged between the surface of said enamel covering and fluid, and means cooperating with said temperature winding for determining the average temperature of the surface of said enamel covering, whereby an average characteristic of said fluid may be determined.

3. In a meter for determining a characteristic of a fluid, a refractory member adapted to extend into the conduit containing said fluid, a heater winding having a negligible temperature coefficient of resistance arranged on said refractory member, an enamel coating surrounding said refractory member and embedding said heater winding, a constant current transformer connected with a source of constant alternating current supply for supplying constant energy to said heater winding, whereby an interchange of heat occurs between said heater winding and fluid to effect the surface of said enamel coating, and a resistance thermometer for determining the average temperature of the surface of said enamel coating contacting with said fluid.

4. In a meter for determining a characteristic of a fluid, a refractory member adapted to extend into the conduit containing said fluid, a heater winding having a negligible temperature coefficient of resistance arranged on said refractory member, an enamel coating surrounding said refractory member and embedding said heater winding, a constant current transformer connected with a source of constant alternating current supply for supplying constant energy to said heater winding, whereby an interchange of heat occurs between said heater winding and fluid to affect the surface of said enamel coating, and a resistance thermometer for determining the average temperature of the surface of said enamel coating contacting with said fluid, the temperature winding of said thermometer being embedded in said enamel coating and spaced from said heater winding.

5. The method of determining a characteristic of a fluid which consists of arranging a thermally sensitive body in the conduit containing said fluid in heat interchanging relationship with said fluid, heating said body from within at a constant rate, and obtaining the average temperature over the surface of the body which is in contact with said fluid.

6. In a meter for determining a characteristic of a fluid, a thermally sensitive body arranged in heat interchanging relation with the fluid, said body including a heater winding having a negligible temperature coefficient of resistance, means for automatically supplying constant current to said heater winding to effect the interchange of heat between said fluid and body, and a resistance thermometer arranged to determine the average temperature of the surface of said body in contact with the fluid.

7. In a meter for determining a characteristic of a fluid flowing in a conduit, a thermally sensitive body arranged in heat interchanging relation with a fluid, said body including a heater winding having a negligible temperature coefficient of resistance and arranged adjacent the surface thereof, means for supplying constant energy to said heater winding to effect an interchange of heat between said fluid and thermally sensitive body including a constant current transformer connected with said heater winding, a source of constant alternating current supply, and a resistance thermometer having its temperature winding arranged within and adjacent the surface of said body and spaced from said heater winding, said temperature winding being adapted to be affected by the average temperature of the surface of said body contacting with the fluid, whereby an average characteristic of said fluid may be determined.

8. In a meter for determining a characteristic of a fluid flowing in a conduit, a refractory member adapted to extend into the conduit containing said fluid, a heater winding having a negligible temperature coefficient of resistance arranged on said refractory member, an enamel coating surrounding said refractory member and embedding said heater winding, means including a constant current transformer connected with a constant source of alternating current supply for supplying constant heat to said heater winding whereby an interchange of heat may occur between said heater winding and fluid and affect the surface of said enamel coating, and a resistance thermometer for determining the temperature of the surface of said enamel coating contacting with said fluid, the temperature winding in said thermometer being embedded in said enamel coating and having the individual coils thereof arranged between the individual coils of said heater winding.

9. In a meter for determining a characteristic of a fluid flowing in a conduit, a refractory member adapted to extend into the conduit containing the fluid, a heater winding having a negligible temperature coefficient of resistance arranged on said refractory member, an enamel coating surrounding said refractory member and embedding said heater winding, means for supplying constant energy to said heater winding whereby an interchange of heat may occur between said heater winding and said fluid to affect the surface of said enamel coating, and a resistance thermometer for determining the average temperature of the surface of said enamel coating contacting with said fluid, the temperature winding of said thermometer being embedded in said enamel coating and being concentrically spaced from said heater winding.

In testimony whereof I affix my signature.

CHARLES B. SAWYER.